I. KAEMPFER.
CASING FOR ELECTRIC CELLS.
APPLICATION FILED DEC. 18, 1912.
1,090,624.
Patented Mar. 17, 1914.
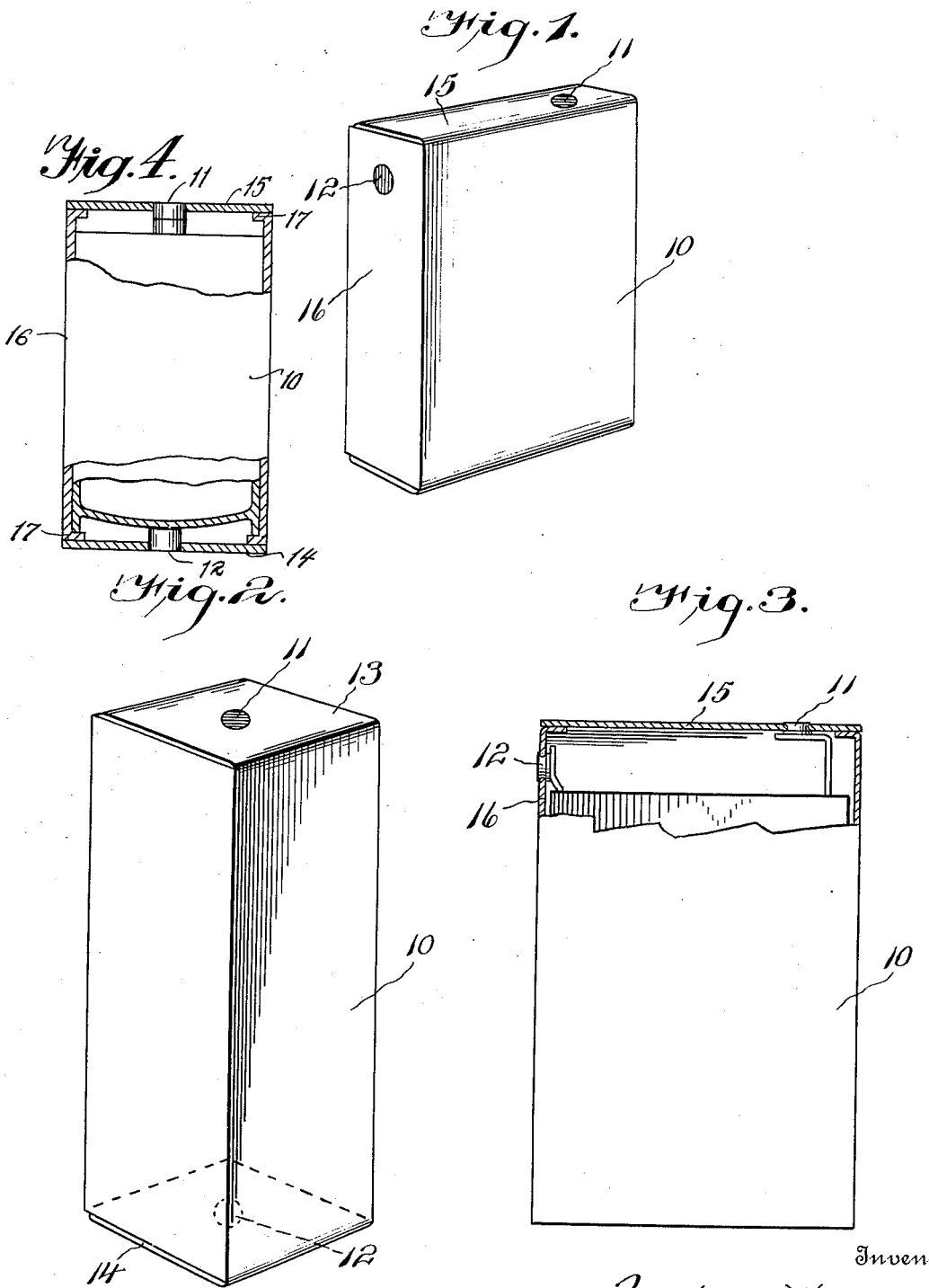

UNITED STATES PATENT OFFICE.

ISABELLA KAEMPFER, OF NEW YORK, N. Y.

CASING FOR ELECTRIC CELLS.

1,090,624.  Specification of Letters Patent. Patented Mar. 17, 1914.

Application filed December 18, 1912. Serial No. 737,488.

*To all whom it may concern:*

Be it known that I, ISABELLA KAEMPFER, a citizeness of the United States, and a resident of New York, State of New York, have invented certain new and useful Improvements in Casings for Electric Cells, of which the following is a full, clear, and exact specification.

This invention relates to improvements in casings for electric cells, and more particularly in casings for dry batteries which allow the cell to be tested without removing the latter from the said casing whereby the purchaser can make sure that the cell is active when he purchases the same without the necessity of opening the sealed box.

It has been proposed heretofore to provide the casing with a removable top provided with openings registering with the binding posts of the cell through which the terminal wires of a galvanometer etc. are introduced. This construction however in practical use showed the disadvantage that much precious time was lost especially if the number of batteries to be tested was great in finding the poles of the cell, and moreover the open holes allowing the free entrance of dust etc. in the casings and the accumulation therein, while the removable top of the casing allowed an exchange of a battery without detection. In order to overcome these disadvantages the hereinafter described casing has been designed in which no holes appear, as the contacts are embedded in the material of the otherwise sealed box.

A practical embodiment of the invention is represented in the accompanying drawing, forming part of this specification, in which similar characters of reference indicate corresponding parts in all the views, the said invention being more fully described hereinafter and then pointed out in the appended claims.

In the drawing: Figure 1 is a perspective view of a casing for a vest pocket battery, showing the contacts at the top and one of the sides. Fig. 2 is a similar view of a casing for a tubular battery, showing the contacts at its top and bottom. Fig. 3 is a view, partly in section, showing the contacts in engagement with the poles of a battery. Fig. 4 is a view partly in section showing the contacts of the battery and casing.

The casing according to the present invention consists chiefly of a box or tube 10 sealed in the manner shown by cementing the top 15 to the turned over edges 17 of the sides, the bottom being sealed in the same manner, having the brass or copper contacts 11, 12 embedded in the material of the casing, either as shown in Fig. 1 at the top 13 and the bottom 14, or as shown in Fig. 2 at the top 15 and the side 16.

It is understood that changes may be made in the form of the container or in the proportions of the parts constituting the same or in its material or in the manner of sealing the container, without departing from the scope and purpose of the invention, therefore I do not wish to be limited to the particular form of protective container for dry batteries herein described and shown.

The metal contacts 11, 12 appearing at the outside of the casing are in direct contact with the contacts of the battery proper within the casing and therefore by connecting test wires to the metal contacts at the outside of the box a short circuit is formed which actuates the battery.

Having thus described my invention what I claim as new is:

1. A sealed paper carton completely incasing a battery having a contact in each end thereof, a contact in each end of the paper carton, each of said last mentioned contacts being adjacent to and adapted to electrically contact with one of the contacts of the said battery and embedded substantially flush with the external face of the carton, whereby the battery may be tested by contacting wires temporarily with the external face contacts without removing the battery from the said carton before the actual use of the same.

2. A sealed paper carton surrounding the contacts of a battery having a contact in each end thereof, contacts in the said carton contiguous with the contacts of the said battery and adapted to electrically connect each end thereof, contacts in the said carton being embedded substantially flush with the external face of the carton, whereby the said battery may be tested by contacting wires temporarily with the said external face contacts without removing the battery from the said carton before the actual use of the same.

In testimony whereof I affix my signature in presence of two witnesses.

ISABELLA KAEMPFER.

Witnesses:
   LEO C. KELLER,
   MAX SCHMIDT.